April 8, 1924.  
A. B. KENDALL  
1,489,642  
AIR BRAKE VENTING SPEED CONTROLLING MECHANISM  
Filed May 5, 1921
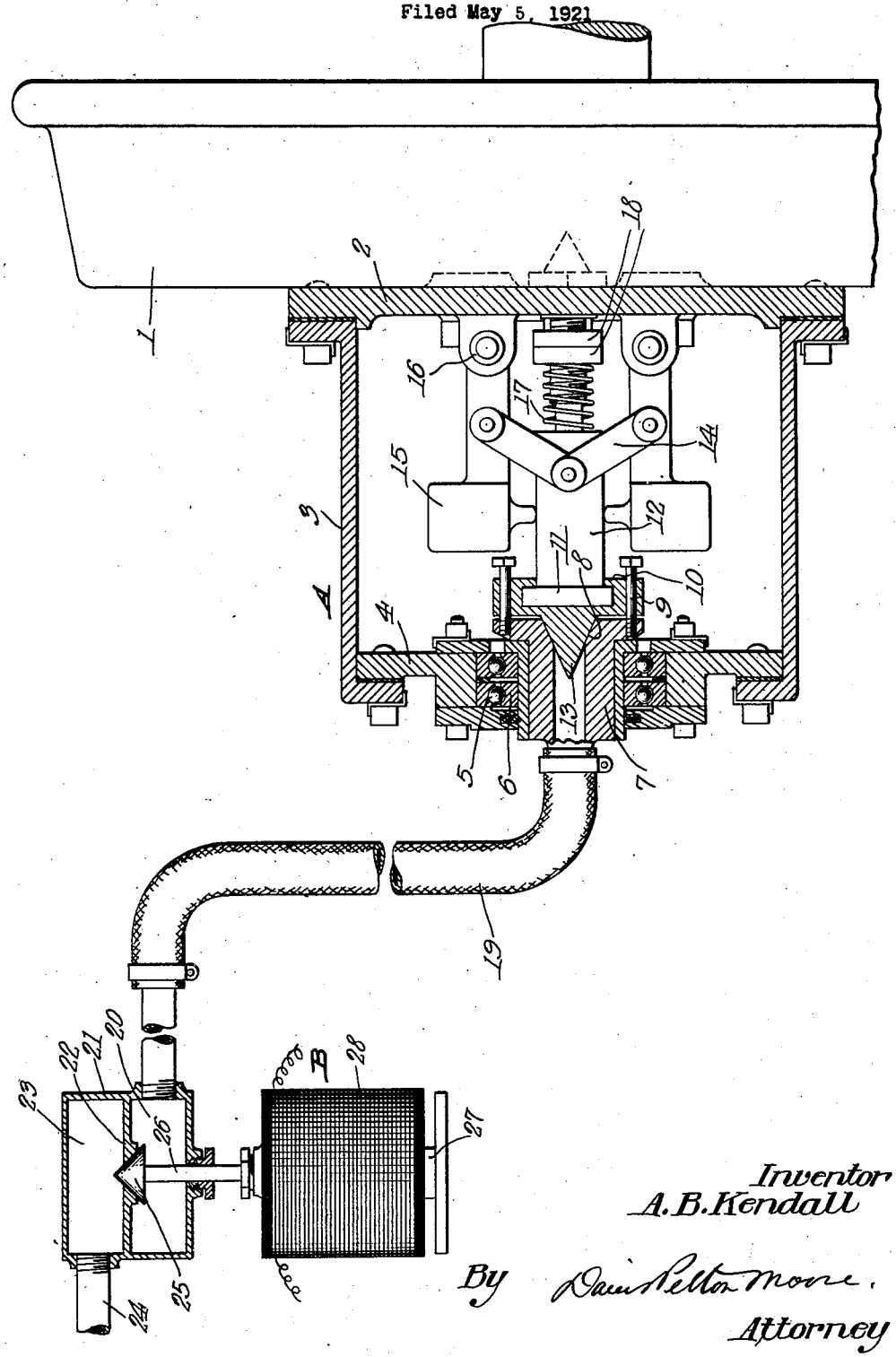
Inventor  
A. B. Kendall  
By Attorney Patented Apr. 8, 1924.

1,489,642

UNITED STATES PATENT OFFICE.

ALLEN B. KENDALL, OF MAYWOOD, ILLINOIS, ASSIGNOR TO REGAN SAFETY DEVICES COMPANY, INC., A CORPORATION OF NEW YORK.

AIR-BRAKE-VENTING SPEED-CONTROLLING MECHANISM.

Application filed May 5, 1921. Serial No. 467,071.

*To all whom it may concern:*

Be it known that I, ALLEN B. KENDALL, a citizen of the United States, residing at Maywood, in the county of Cook and State of Illinois, have invented certain new and useful Improvements in Air-Brake-Venting Speed-Controlling Mechanism, of which the following is a specification, reference being had therein to the accompanying drawing.

This invention relates to improvements in speed controlling means employed for example to control the speed of trains, one object of the invention being the provision of a simple device in which a centrifugally operated means directly vents the air pressure pipe of an airbrake system so that the train will be held at a predetermined speed.

A further object of this invention comprehends the provision of a simple means for controlling the speed of the train should the same be moving faster than a predetermined or permissive speed, which means can be readily attached in position without in any way disarranging the present apparatus on the locomotive or the cars of a train, as for example by attaching the same to the wheel of a car or locomotive.

A still further object of the invention comprehends the provision of vehicle controlling apparatus responsive to the concurrence of an excessive speed condition of the vehicle and a warning or cautionary condition on the track or roadway for producing a speed controlling effect on the vehicle.

To the accomplishment of the foregoing and such other objects as may hereinafter appear, my invention consists in the elements and their relation one to the other, as hereinafter particularly described and sought to be defined in the claims, reference being had to the accompanying drawings, which show a preferred embodiment of my invention and in which:

The figure illustrates a diagrammatic view of the apparatus with parts in section, showing the operation of the same.

Referring now more in detail to the drawings, the invention in one of its aspects includes the provision of speed control means for conditioning the braking system of a vehicle for operation combined with mechanism operable under a warning or cautionary track condition for permitting such operation, a speed control effect on the vehicle being therefore produced upon concurrence of an excessive vehicle speed condition and a warning track condition. To accomplish this, the invention more specifically comprises a speed control means generally designated as A operable under speed conditions for venting a fluid duct connected to the air brake system, and provisions generally designated as B normally closing communication between the air brake system and the control means A and responsive to a cautionary track condition for opening such communication.

The speed control means A is preferably of the centrifugally actuated type, and in the preferred construction the speed control means is directly attached to a car wheel 1 so as to be rotatable therewith. The speed control means A includes a back plate 2 which is attached to the outer face of the car wheel 1, a casing 3, and a removable outer cap 4, the outer cap 4 and the plate 2 carrying the operated parts of the speed controller, the main part of the present construction being shown in the copending application of Archibald G. Shaver Ser. No. 303,191, filed June 10, 1919.

Mounted on the outer cap 4 there is provided a ball bearing 5 receiving the inner bearing ring 6 of a fixed spool or bushing 7, the said bushing being provided with a valve seat 8. Attached to the inner flange of the bushing 7 there are provided a plurality of rods 9, and to the said rods is attached for sliding movement only the valve carrying member 10 provided with the valve head 13. For operating the valve carrying member 10, there is provided the slidably mounted element 12 having a collar or flange 11 rotatably fitted in the valve carrying member as clearly shown in the drawings, and for operating the slidably mounted element 12 there is provided the centrifugally operated arms 15 pivotally mounted at 16 on the rear plate 2, and the toggle members 14 connecting the centrifugally operated arms 15 to the element 12, the arms and toggle members being normally held in position as shown in the drawings by the spring 17, the tension of which is adjustable by the nuts 18. With this construction it will be seen that the casing 3, the centrifugal arms 15 and the sliding element 12 are rotatable with the wheel 1, while the member 7 and the valve head 13 may be maintained against rotation, the valve head 13 being permitted a sliding movement for opening and closing the valve.

Connected to the port for the valve 13 there is provided a fluid duct 19 associated with the air brake system of the vehicle and connected to the provisions B which in turn communicates with the brake pipe 24 of the air brake system, as will be detailed presently. With this construction it will be seen that under speed conditions of the vehicle the speed control means A in unseating the valve head 13 will vent the fluid duct 19 and condition the air brake system for operation.

For the purpose of permitting the operation of the air brake system under a predetermined track condition such as a "caution" track condition, there is provided the control provisions B heretofore referred to, the said provisions being arranged between the brake pipe 24 and the fluid duct 19 and functioning for normally closing communication between the same and for opening such communication under the predetermined condition. The provisions B preferably include an electromagnetic valve comprising the casing 21 provided with the chambers 20 and 23 separated by the partition 22, the chamber 23 communicating with the brake pipe 24 and the chamber 20 communicating with the fluid duct 19, as clearly shown in the drawings, a valve head 25 attached to a valve stem 26 slidably mounted in the casing being provided for normally closing communication between the chambers 23 and 20. For maintaining the valve head 25 normally closed, there is provided the electromagnet 28 having the armature 27 attached to the valve stem 26, the said electromagnet 28 being normally energized under "clear" track conditions as fully disclosed in the train controlling system shown in the copending application of Archibald G. Shaver Serial No. 292,548 filed April 25, 1919.

The operation of my speed control apparatus will in the main be fully apparent from the above detailed description thereof. It will be apparent that under normal conditions the valve 25 is seated, as is also the valve 13, and the train is moving along at unlimited speed under "safe" track conditions. Should the speed of the train exceed the predetermined or permissive speed, the centrifugal members 15 will unseat the valve 13, but if no "caution" indication is received by the electromagnet 28, the valve 25 will remain seated and the air from the air brake system will not be permitted passage through the fluid duct or pipe 19, and no speed control effects will be produced on the train. If, however, a "caution" indication is received by the electromagnet 28 responsive to a "caution" track condition, the valve 25 is opened and under excessive speed conditions the air will be vented through the member 7 to set the brakes and reduce the speed of the train. If, however, the valve 25 is operated when the train is moving at a permissive speed, the valve 13 will remain closed and no control effect will be produced.

Although I have shown and described my device in the preferred form, it will be obvious that many changes and modifications may be made in the structure disclosed without departing from the spirit of the invention, defined in the following claims.

What I claim as new is:

1. In combination, an air valve, an electro-pneumatic valve for controlling the passage of air thereto, and a speed control governing means for normally closing the air valve and for opening the same under speed conditions.

2. In combination, an air valve, an electro-pneumatic valve for controlling the passage of air thereto, and a centrifugally operated speed control governing means for normally closing the air valve and for opening the same under speed conditions.

3. The combination with an air conduit having an outlet valve at one end thereof and an intermediate valve chamber, an electrical means for controlling the valve with the valve chamber, and a speed actuated means for operating the outlet valve.

4. The combination with an air conduit having an outlet valve at one end thereof and an intermediate valve chamber, an electrical means for controlling the valve with the valve chamber, and a centrifugal speed actuated means for operating the outlet valve.

5. In combination with the train pipe of an air brake system, normally closed speed actuated valve means for opening the train pipe to atmosphere only when a permissive speed is exceeded, and provisions for controlling the passage of air through said pipe to said means.

6. In combination with the train pipe of an air brake system, normally closed speed control valve means operable for venting the train pipe only under speed conditions, and provisions intermediate the train pipe and said valve means for normally closing communication from the former to the latter and operative for opening such communication under a predetermined track condition.

7. A vehicle control apparatus comprising a normally closed fluid duct connected to the air brake system, normally closed speed actuated valve means for opening said duct only under excessive speed conditions, and provisions normally cutting off passage of air through said duct and to said means operative under cautionary track conditions for opening said passage whereby the air brake system will be vented when the permissive speed of the vehicle is exceeded under "caution" track conditions.

8. A vehicle control apparatus comprising a normally closed fluid duct connected to the air brake system, speed actuated valve means for opening said duct under excessive speed conditions, and electromagnetic valve means normally cutting off passage of air through said duct and to said means operative under cautionary track conditions for opening said passage whereby the air brake system will be vented when the permissive speed of the vehicle is exceeded under "caution" track conditions.

9. In a vehicle control apparatus, a fluid duct communicating with the braking system of the vehicle, means for normally closing said duct, and speed actuated mechanism attached to a wheel of the vehicle for operating said means to open said duct under speed conditions.

10. In a vehicle control apparatus, a fluid duct communicating with the braking system of the vehicle, a valve for normally closing said duct, and a centrifugal speed governor attached to for rotation with a wheel of the vehicle for operating said means to open said duct under speed conditions.

11. In a vehicle control mechanism, in combination, a fluid duct associated with the braking system of the vehicle, and a speed control mechanism carried by a wheel of the vehicle for controlling the closing and opening of said duct.

12. In a vehicle control mechanism, in combination, a fluid duct associated with the braking system of the vehicle, and a centrifugal speed governing means carried by a wheel of the vehicle for controlling the closing and opening of said duct.

13. In a vehicle control apparatus, in combination, a fluid duct associated with the braking system of the vehicle, speed actuated means carried by a wheel of the vehicle for controlling the opening and closing of said duct, and provision for controlling the passage of air through said duct to said means.

14. A vehicle control apparatus comprising a normally closed fluid duct connected to the air brake system, speed actuated means attached to and carried by a wheel of the vehicle for opening said duct under excessive speed conditions, and provisions normally cutting off passage of air through said duct and to said means operative under cautionary track conditions for opening said passage whereby the air brake system will be vented when the permissive speed of the vehicle is exceeded under "caution" track conditions.

15. In a vehicle control mechanism, in combination with the wheel of the vehicle, a valve, and a speed control mechanism carried by the wheel of the vehicle for controlling said valve.

16. In a vehicle control mechanism, in combination with a wheel of the vehicle, a centrifugal governor carried by the wheel, a casing therefor, a valve carried by the casing, the said valve being connected to the governor for operation thereby.

17. In a vehicle control mechanism, in combination with a wheel of the vehicle, a casing attached to the wheel, a centrifugal governor attached to the casing and rotatable therewith, a valve mounted in said casing for rotation relative thereto, the said valve being actuated by said governor.

In testimony whereof I affix my signature.

ALLEN B. KENDALL.